United States Patent [19]

Reilly

[11] 4,349,167

[45] Sep. 14, 1982

[54] CRASH LOAD ATTENUATING PASSENGER SEAT

[75] Inventor: Mason J. Reilly, Media, Pa.

[73] Assignee: The Boeing Company, Seattle, Wash.

[21] Appl. No.: 89,695

[22] Filed: Oct. 30, 1979

[51] Int. Cl.³ .................... B64D 25/04; B64D 11/06
[52] U.S. Cl. .............................. 244/122 R; 297/216; 188/372; 296/65 A
[58] Field of Search ................ 244/122 R; 188/1 C; 297/314, 216; 248/548, 636; 296/65 A

[56] References Cited

U.S. PATENT DOCUMENTS

| | | | |
|---|---|---|---|
| 1,511,264 | 10/1924 | Carter | 188/1 C |
| 2,933,127 | 4/1960 | Brewster | 244/122 R |
| 3,603,638 | 9/1971 | McGregor | 297/216 |
| 3,697,128 | 10/1972 | Strier et al. | 297/216 |
| 3,922,034 | 11/1975 | Eggert | 244/122 R |
| 3,968,863 | 7/1976 | Reilly | 188/1 C |
| 4,150,805 | 4/1979 | Mazelsky | 244/122 R |

OTHER PUBLICATIONS

Mason J. Reilly, "Crashworthy Troup Seat Investigation" USAAMROL-TR-74-93, Dec. 1974 317 pp.

*Primary Examiner*—Galen L. Barefoot
*Attorney, Agent, or Firm*—Felix J. D'Ambrosio; Jack D. Puffer

[57] ABSTRACT

A light-weight aircraft passenger seat, which includes a plurality of integrally mounted wire-bending energy attenuators, and which can be floor mounted to face either forward or backward. Four seat legs, pivotally connected between the seat and floor, extend upward at the same angle from the floor, which is determined by two energy attenuators also pivotally connected between the seat and the floor, and extending upward from the floor in an opposite direction from the seat legs. When facing forward, the seat is stroked forward and downward. When facing backward, the seat is stroked backward and downward. In either a forward or backward facing disposition, the free ends of the energy attenuations extend into the back of the seat. Also the seat is flexibly connected to the seat legs and energy attenuators, which, in turn are connected by swivels to the floor to provide seat articulation as the floor distorts during a crash.

7 Claims, 9 Drawing Figures

CRASH LOAD ATTENUATING PASSENGER SEAT

BACKGROUND OF THE INVENTION

This invention relates generally to the field of chairs and seats and more particularly to an improved crash load attenuating aircraft passenger seat.

The known types of energy attenuating seats which have been developed for pilots and troops in military helicopters are not applicable for passengers in transport or other fixed wing aircraft. For example, pilots seats, such as disclosed in U.S. Pat. No. 4,150,805, issued Apr. 24, 1979 to Bernard Mazelsky, are supported from a fixed floor mounted framework and an energy attenuating system provides stroking or relative motion of the seat with the fixed framework. However, such a pilot energy attenuating seat is not suitable for use as a passenger seat in an aircraft having a plurality of passenger seats because of weight limitations. Also, in a crash of the aircraft, the seats of all the passengers except those in the front row, would be stroked in a forward direction to cause impact of the occupants with the fixed framework of the passenger seat directly in front of these occupants.

In U.S. Pat. No. 3,868,143, issued Feb. 25, 1975 to myself, a side-facing energy attenuating seat for troop carrying aircraft is disclosed. These troop seats are suspended from the ceiling and stroke relative to the ceiling in a crash. These energy attenuating troop seats thus require a ceiling which will withstand the attenuator loading, and in which there is sufficient strength to provide anchor points for the seats which will react to forward loading. Consequently, these energy attenuating troop seats are not suitable to high bay, light structured type aircraft. Also, these energy attenuating troop seats do not include a reclining seat back such as is generally included for passenger aircraft seats.

OBJECT AND SUMMARY OF THE INVENTION

Therefore, it is an object of the invention to provide a light weight, crash load attenuating, aircraft passenger seat having an adjustable, reclining seatback.

It is another object of the invention to provide a crash load attenuating passenger seat which is mounted directly to the floor of the aircraft and requires no fixed support mounting structure, to thus prevent impact of a passenger with a fixed structure of the seat in front of the passenger in the event of a crash.

It is a further object of the invention to provide a crash load attenuating passenger seat having an integral energy attenuation system.

A still further object of the invention is to provide a crash load attenuating passenger seat which requires no attachments to the ceiling, and which is suitable for use in high bay, lightly structured passenger carrying aircraft.

It is yet another object of the invention to provide a floor mounted, load attenuating, passenger seat which will conform to a warping or twisting floor structure and still provide controlled deceleration for the seat occupant whereby the occupant is decelerated at a slower rate than the surrounding aircraft structure.

A still further object of the invention is to provide a crash load attenuating passenger seat which can be mounted to face either the front or the rear of the aircraft.

These and other objects are accomplished according to the present invention by a collapsible safety seat which is pivotally mounted to the floor of the aircraft for rotation in either a forward and downward direction or a backward and downward direction by a plurality of rigid support members, or legs struts, which are held in a normal position by energy attenuators similar to those disclosed in the above reference U.S. Pat. No. 3,968,863. The leg struts and energy attenuators have lower ends which are pivotally connected to the aircraft floor, and upper portions which are connected to the passenger seat through universal couplings, which allow the seat to conform to a severely twisting or warping floor structure without tearing loose. A wire bending trolley of the energy attenuator, which is pivotally connected to the passenger seat, moves downward and either forward or backward, to absorb energy and provide controlled deceleration for the seat occupant upon the occurrence of a crash. The upper free end of the energy attenuator is moved upward into the seat back when the seat strokes, or moves downward, to the floor during crash deceleration as the energy attenuator absorbs crash load energy. The upper end of the energy attenuator, being within the seat back, is shielded from impact with either the occupant of that seat or the occupant of a seat behind that seat.

Prior to the present invention, crash load attenuating seats were mounted or suspended from auxiliary structures by energy absorbing, or attenuating members. Since the energy attenuators in the present invention are integral with the passenger seat, no auxiliary support structures are required, which results in a considerable savings in weight and space.

These and other objects and advantages of the invention will become more apparent from the following description of the preferred embodiments, taken together with the drawings.

DESCRIPTION OF THE PREFERRED EMBODIMENTS

Figure 1:
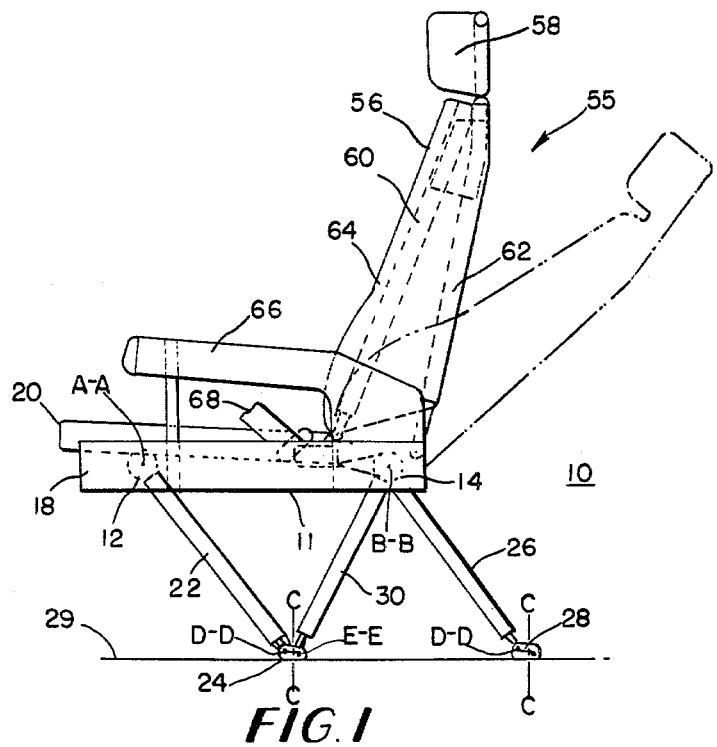
FIG. 1 is a side view of a two occupant aircraft passenger seat, according to the invention, disposed in a forward facing position.
Figure 2:
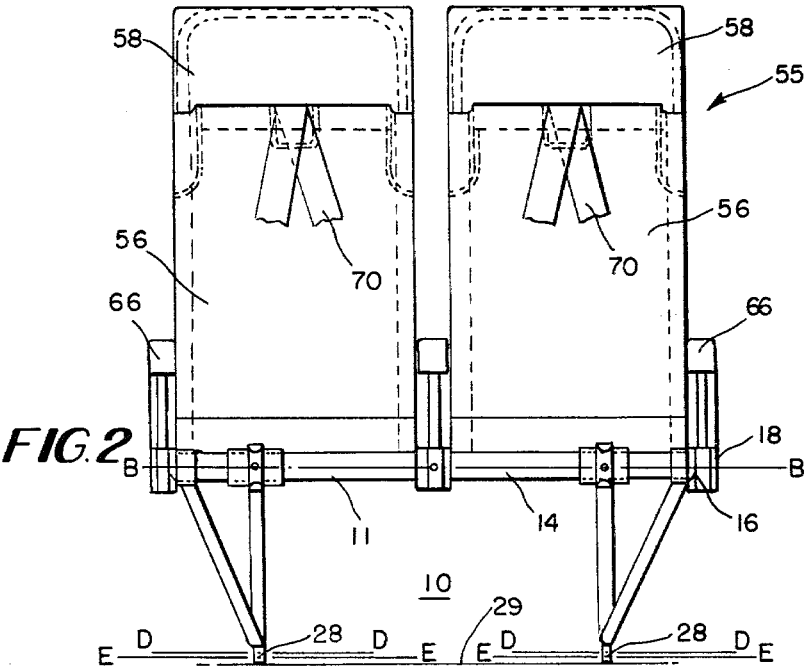
FIG. 2 is a back view of the passenger seat shown in FIG. 1.

In FIGS. 1 and 2, a two-passenger aircraft seat 10 is arranged in a forward facing configuration. A seat pan assembly 11 includes a forward transverse tubular member 12 and a rear transverse tubular member 14 which define respective parallel front and rear transverse axes A—A and B—B of the seat pan assembly 11. The forward and rear transverse tubular members 12 and 14 are connected by universal joints 16 to three longitudinally extending support beams 18 which support two cushioned seat pans 20 therebetween. The top ends of two front support links, or legs 22, are pivotally connected for rotation about the front transverse tubular member 12, and the bottom ends of the front legs 22 are connected to the aircraft floor by respective swivel connectors 24. The top ends of two back support links or legs 26 are pivotally connected for rotation about the axis B—B of the rear transverse tubular member 14 and the bottom ends of the back legs 26 are connected to the aircraft floor by respective swivel connectors 28.

Each swivel connector 24 or 28 is pivotally connected to the vehicle floor 29 for movement relative to the vehicle floor 29 about a vertical axis C—C of the swivel connector 24 or 28. Also, each swivel connector 24 or 28 is pivotally connected to an adjacent leg 22 or 26 for movement of the leg 22 or 26 relative to the swivel connector 24 or 28 about a swivel connector axis D—D parallel to the transverse axes A—A and B—B.

Figure 4:
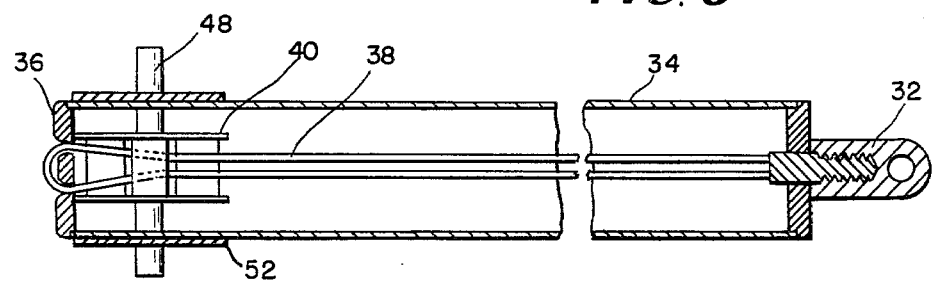
FIG. 4 is a partial cross-sectional view, with a center portion removed, of an energy attenuator of the passenger seat shown in FIG. 1.
Figure 5:
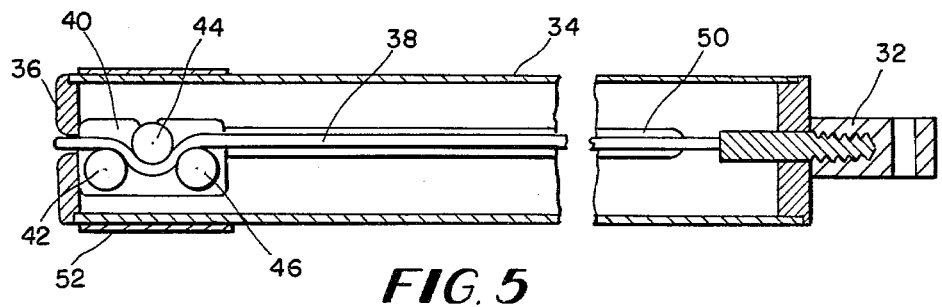
FIG. 5 is a cross-sectional view, with a center portion removed, of the energy attenuator shown in FIG. 4, taken along line 5—5 of FIG. 4.

Two energy attenuators 30, similar to the energy attenuator disclosed in my U.S. Pat. No. 3,968,863, issued July 13, 1976, have bottom end plugs 32 which are pivotally connected respectively to the swivel connectors 24 for movement about third swivel connector axes E—E parallel to the traverse axes A—A and B—B. As best seen in FIGS. 4 and 5, the energy attenuator 30 includes an aluminum tube 34 carrying the bottom end plug 32 at one end, and a top end plug 36 at an opposite end. A high tensile strength wire 38, which extends through the tube 34, has opposite ends which are anchored to the bottom end plug 32 and a mid portion which is anchored to the top end plug 36. The energy attenuator 30 includes a trolley 40 carrying three rollers 42, 44, 46 which are pivotable about axes orthogonal to the wire 38, through which the wire 38 extends. The three rollers 42, 44, 46 are disposed so that as the wire 38 passes through the three rollers, it must be bent around the center roller 44. The center roller 44 is mounted on a trunnion pin 48 which extends on both sides through two opposite, longitudinally extending slots 50 of the tube 34, and also through opposite sides of collar member 52 which is slidably disposed about the tube 34.

Figure 3:
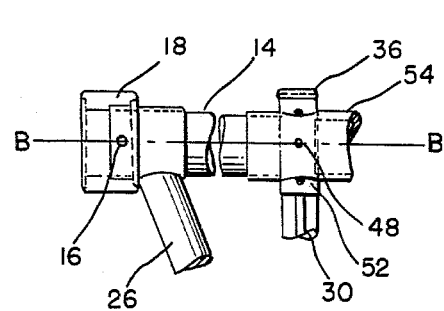
FIG. 3 is a partial, perspective view of a rear transversely extending tubular member of the seat shown in FIG. 1, showing the pivotal connections between this tubular member and an energy attenuator, a seat leg, and a seat support beam.

As best seen in FIG. 3, the rear transverse tubular member 14 includes the collar member 54 having an opening through which the upper end of the energy attenuator 30 extends. The trolley 40 of the energy attenuator 30 is pivotally connected to the collar portion 54 of the rear transverse tubular member 14 by the trunnion pin 48.

Each front leg 22 and its associated energy attenuator 30, which is connected to the same front swivel connector 24, extends upward from the floor in the same vertical plane. Also, each back swivel connector 28 is disposed in line with an associated front swivel connector 24 along a longitudinally extending axis. However, since each energy attenuator 30 extends through the rear transverse tubular member 14, the pivotal connections between the back legs 26 and the rear transverse tubular member 14 cannot lie in the same vertical planes as the pivotal connections of the front legs 22, the energy attentuators, and the back swivel connectors 28. For this reason, the back legs 26 extend upward and outward towards each side of the seat 10 from the rear swivel connectors 28 to the rear traverse tubular member 14, as shown in FIGS. 2 and 3.

A seat back assembly 55 includes two individual reclining backs 56 each having adjustable head rests 58. Each back 56 includes a rectangular front truss member 60 which is pivotally connected at its lower end to adjacent support beams 18 for pivotal rotation of the back 56 about a horizontal transversely extending axis. Each back 56 also includes two rear transverse members 62 having upper ends which are connected to the front truss member 60 and telescoping lower ends which are pivotally connected to adjacent support beams 18 and which are adjustable to determine the inclination of the back 56. The front truss member 60 is covered with a low elongation polyester fabric to which a cushion 64, covered with a fabric material, is attached. Each seat 10 includes three removable armrests 66 having upper surfaces which are cushioned and covered with upholstry material. Also, each seat 10 includes lap and shoulder safety belts 68, 70.

Figure 6:
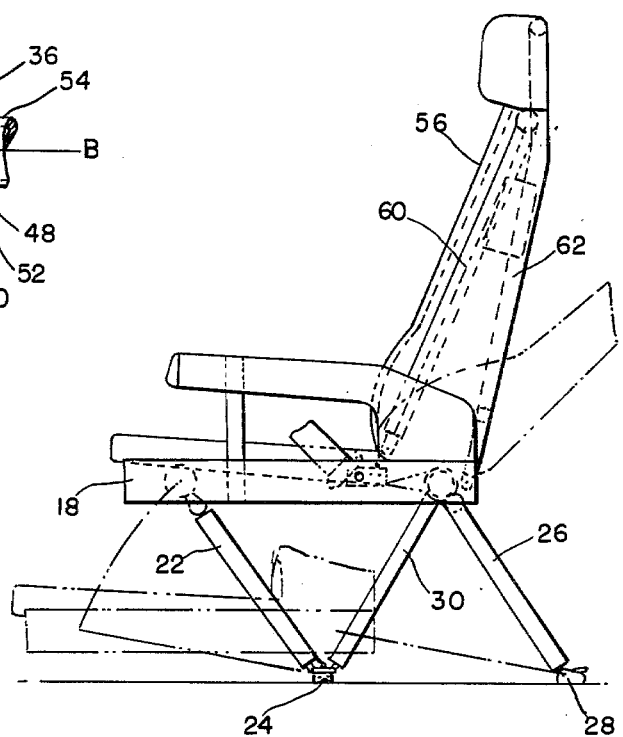
FIG. 6 is a side view of the passenger seat shown in FIG. 1, which shows by dashed lines the stroke position of this seat.
Figure 7:
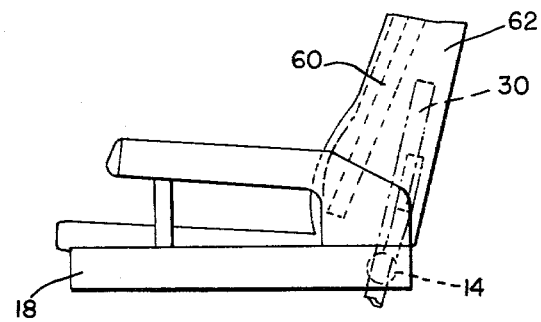
FIG. 7 is a partial side view of the passenger seat of FIG. 1, showing the path of travel of a free end of the energy attenuator shown in FIGS. 4 and 5 during crash deceleration.

As seen in FIG. 1, each of front and rear legs 22 and 26 extend forward from their respective swivel connectors 24, 28 at the same angle to the aircraft floor, thus forming two parallelograms which are stabilized and held in a fixed position by the energy attenuators 30, and which constitute a support assembly for the seat 10. During crash deceleration, the wire bending energy attenuators 30 stroke the seat 10 to move it forward and downward to its fully stroked position shown in dashed lines in FIG. 6, and a free upper end of the energy attenuator 30 is moved upward into an empty space between the front and rear truss members 60, 62 within the seat back 56, as shown in FIG. 7. The universal joints 16 and the swivel connectors 24, 28, permit seat articulation without causing seat damage as the floor 29 distorts in a crash.

The wire bending energy attenuator 30 is highly reliable, producing repeatable and flat force deflection curves, and is not affected by environmental factors. During crash deceleration, the rollers 42, 44, and 46 flex the wire 38 as the trolley 40 is moved downward to its stroked position to thus limit the rate of deceleration of a seat occupant, and maintain the rigidity of the seat after stroking.

Figure 8:
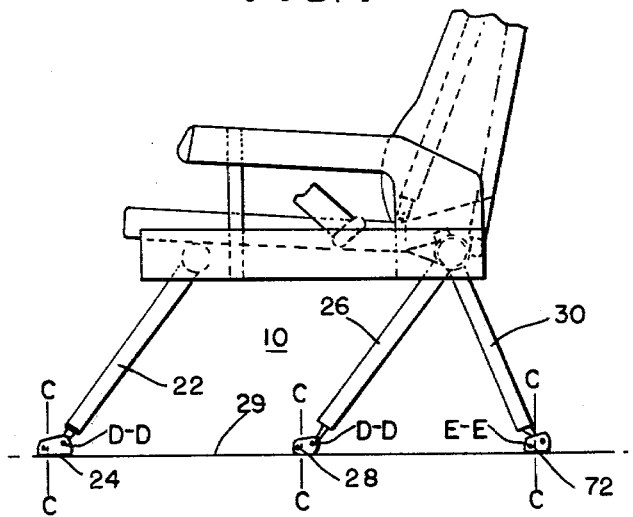
FIG. 8 is a partial side view of a backward facing passenger seat similar to the passenger seat of FIG. 1.
Figure 9:
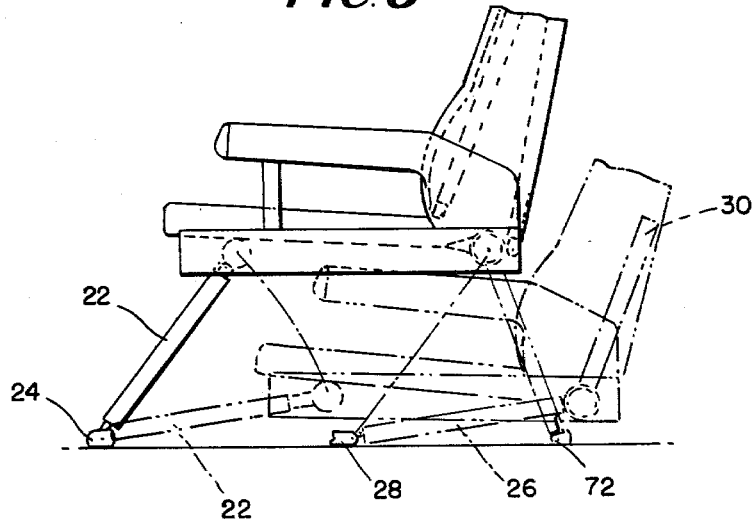
FIG. 9 is a partial side view of the passenger seat shown in FIG. 8, in which the fully stroked position of the seat is shown by dashed lines.

The passenger seat 10 can be changed from a forward facing seat to a backward facing seat by first detaching the legs 22, 26 and energy attenuators 30 from the swivel connectors 24, 28, then repositioning the swivel connectors 24, 28, and adding two additional swivel connectors 72, as shown in FIG. 8. The front and back legs 22, 26, are then rotated toward the front of the seat and the energy attenuators 30 are rotated toward to back of the seat. The front legs 22 are then reattached to the repositioned swivel connectors 24, the back legs 26 are reattached to the swivel connectors 28, and the energy attenuators 30 are reattached to the swivel connectors 72, respectively, as shown in FIG. 8. When the seat 10 is thus disposed in a backward facing position, during crach deceleration, the seat 10 moves backward and downward against the floor 29 of the aircraft, and the free ends of the energy attenuators 30 are moved upward into the seat backs 56, as shown by dashed lines in FIG. 9.

Obviously, many modifications and variations of the present invention are possible in view of the above teachings. For example, these teachings apply equally as well to a single occupant passenger seat as well as to multiple occupant seats. For this reason, it is intended that this invention be only limited by the scope of the appended claims.

What is claimed is:

1. A collapsible safety seat for a vehicle, comprising:
   a generally horizontally extending seat pan assembly having a front transverse axis and a rear transverse axis parallel to, and spaced from, said front transverse axis;
   a generally vertically extending seat back assembly; and
   at least one seat support assembly, which includes
      a front leg having an upper end pivotally connected to said seat pan assembly for rotation about said front transverse axis of said seat pan assembly, and a lower end which includes a first axis parallel to said front transverse axis of said seat pan assembly, said front leg being pivotally connected to a floor of the vehicle for rotation about said first axis, said front leg extending upward at an angle to said floor in the direction of travel of the vehicle,
      a rear leg having an upper end pivotally connected to said seat pan assembly for rotation about said rear transverse axis of said seat pan assembly, and a lower end which includes a second axis parallel to said first axis and said front and rear transverse axes of said seat pan assembly, said rear leg being pivotally connected to the vehicle floor for rotation about said second axis, said rear leg extending upward at approximately the same angle to said floor in the direction of vehicle travel as said front leg, and
      an energy attenuator having a first end, an opposite second end, a trolley which is movable along a predetermined path between said first and second ends of said energy attenuator, and energy absorbing means, which when said trolley is moved in one direction along its path of travel by a first force, exerts a second force on said trolley opposing said first force, said trolley being pivotally connected to said seat pan assembly for rotation about said rear transverse axis of said seat pan assembly, said trolley being positioned adjacent said first end of said energy attenuator, said second end of said energy attenuator including a third axis parallel to said first and second axes, said energy attenuator being pivotally connected to the vehicle floor for rotation about said third axis, said energy attenuator extending upward at a second angle to said vehicle floor in a direction opposite to the direction of vehicle travel;
   whereby upon the occurrence of a vehicle crash, said trolley is moved downward and in the direction of travel of the vehicle toward said second end of said energy attenuator by a crash deceleration force against the opposite force exerted on said trolley by said energy absorbing means, to move said seat downward and in the direction of vehicle travel at a rate of deceleration which is less than the rate of deceleration of the surrounding vehicle structure, said energy attenuator being disposed so that as said trolley is moved toward said second end of said energy attenuator, said first end of said energy attenuator is moved into said seat back assembly.

2. A collapsible safety seat, as described in claim 1, wherein said at least one seat support assembly comprises at least two transversely spaced apart, parallel arranged, seat support assemblies.

3. A collapsible safety seat for a vehicle, comprising:
   a generally horizontally extending seat pan assembly which includes
      at least two longitudinally extending support beams,
      at least one seat pan supported by said support beams,
      a forward transverse member defining a front transverse axis and connected to said at least two support beams by universal joints carried by said forward transverse member, and
      a rear transverse member defining a rear transverse axis and connected to said at least two support beams by universal joints carried by said rear transverse member;
   a generally vertically extending seat back assembly; and
   at least one seat support assembly, which includes
      a front leg having an upper end pivotally connected to said seat pan assembly for rotation about said front transverse axis of said seat pan assembly, and a lower end which includes a first axis parallel to said front transverse axis of said seat pan assembly, said front leg being pivotally connected to a floor of the vehicle for rotation about said first axis, said front leg extending upward at an angle to said floor in the direction of travel of the vehicle,
      a rear leg having an upper end pivotally connected to said seat pan assembly for rotation about said rear transverse axis of said seat pan assembly, and a lower end which includes a second axis parallel to said first axis and said front and rear transverse axes of said seat pan assembly, said rear leg being pivotally connected to the vehicle floor for rotation about said second axis, said rear leg extending upward at approximately the same angle to said floor in the direction of vehicle travel as said front leg, and
      an energy attenuator having a first end, an opposite second end, a trolley which is movable along a predetermined path between said first and second ends of said energy attenuator, and energy absorbing means, which when said trolley is moved in one direction along its path of travel by a first force, exerts a second force on said trolley opposing said first force, said trolley being pivotally connected to said seat pan assembly for rotation about said rear transverse axis of said seat pan assembly, said trolley being positioned adjacent said first end of said energy attenuator, said second end of said energy attenuator including a third axis parallel to said first and second axes, said energy attenuator being pivotally connected to the vehicle floor for rotation about said third axis, said energy attenuator extending upward at a second angle to said vehicle floor in a direction opposite to the direction of vehicle travel;
   whereby upon the occurrence of a vehicle crash, said trolley is moved downward and in the direction of travel of the vehicle toward said second end of said energy attenuator by a crash deceleration force against the opposite force exerted on said trolley by said energy absorbing means, to move said seat downward and in the direction of vehicle travel at a rate of deceleration which is less than the rate of deceleration of the surrounding vehicle structure.

4. A collapsible safety seat, as described in claim 3, wherein each trolley of said energy attenuators is pivotally connected to said rear transverse member, and said energy attenuators are disposed so that, as said trolleys are moved toward said second ends of said energy attenuators, said first ends of said energy attenuators are moved into said seat back assembly of said seat.

5. A collapsible safety seat, as described in claim 4, wherein said seat back assembly comprises a plurality of individually adjustable, reclining seat backs.

6. A collapsible safety seat, as described in claim 4, which further comprises a plurality of swivel connectors, one for each front and back leg, said front and back legs being pivotally connected to said swivel connectors for movement about their respective first and second axes, each swivel connector including a vertical axis, said swivel connectors being pivotally connected to said vehicle floor for movement about their respective vertical axes.

7. A collapsible safety seat, as described in claim 6, wherein said vehicle is a passenger-carrying aircraft.

* * * * *